(12) United States Patent
Harris et al.

(10) Patent No.: US 6,215,211 B1
(45) Date of Patent: Apr. 10, 2001

(54) ALTERNATOR BEARING SLEEVE, BRUSH HOLDER, AND CAP SYSTEM

(75) Inventors: Richard Kenneth Harris, Walled Lake; Steven John Yockey, Ann Arbor, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/307,441

(22) Filed: May 10, 1999

(51) Int. Cl.[7] .............................. H02K 1/04; H02K 5/10; H01R 39/38
(52) U.S. Cl. ................ 310/43; 310/88; 310/239
(58) Field of Search ...................... 310/42, 43, 88, 310/89, 90, 238, 239, 242, 245, 247

(56) References Cited

U.S. PATENT DOCUMENTS

| | | | |
|---|---|---|---|
| 3,233,130 | 2/1966 | Bates | 310/88 |
| 3,875,436 * | 4/1975 | MacFarland | 310/43 |
| 3,963,949 | 6/1976 | Church | 310/43 |
| 4,387,314 * | 6/1983 | Iwaki et al. | 310/88 |
| 4,680,495 | 7/1987 | Chiampas et al. | 310/220 |
| 4,959,576 | 9/1990 | Horibe et al. | 310/239 |
| 5,296,772 * | 3/1994 | Bradfield et al. | 310/242 |
| 5,345,132 | 9/1994 | Sasaki et al. | 310/239 |
| 5,424,600 * | 6/1995 | Ishikawa et al. | 310/220 |
| 5,550,418 * | 8/1996 | Chung | 310/239 |
| 5,753,992 * | 5/1998 | Avitable et al. | 310/239 |

* cited by examiner

Primary Examiner—Nestor Ramirez
Assistant Examiner—Dang Dinh Le
(74) Attorney, Agent, or Firm—Rhonda L. McCoy-Pfau

(57) ABSTRACT

An assembly (30) for use with a rotating electric machine has a first injection-molded plastic part (32), a second injection-molded plastic part (34), and a third injection-molded plastic part (36). Parts (32, 34) are a bearing sleeve and a brush holder respectively, while part (36) is a cap. The bearing sleeve has a transverse wall (138) from which channels (146, 148) extend in one direction. A cylindrical wall extends in the other direction to form a bearing cup (136) for receiving a bearing assembly. The brush holder has two side-by-side brush guides (62, 64) each containing a respective brush (38, 40). It also has two channels (110, 112) that interlock with the channels of the bearing sleeve to accurately and rigidly place the two parts (32, 34) in assembly. The cap closes an axial end of the bearing sleeve and attaches to the brush holder. The parts are further characterized by various structural features, as well as fabrication and assembly methods.

19 Claims, 7 Drawing Sheets

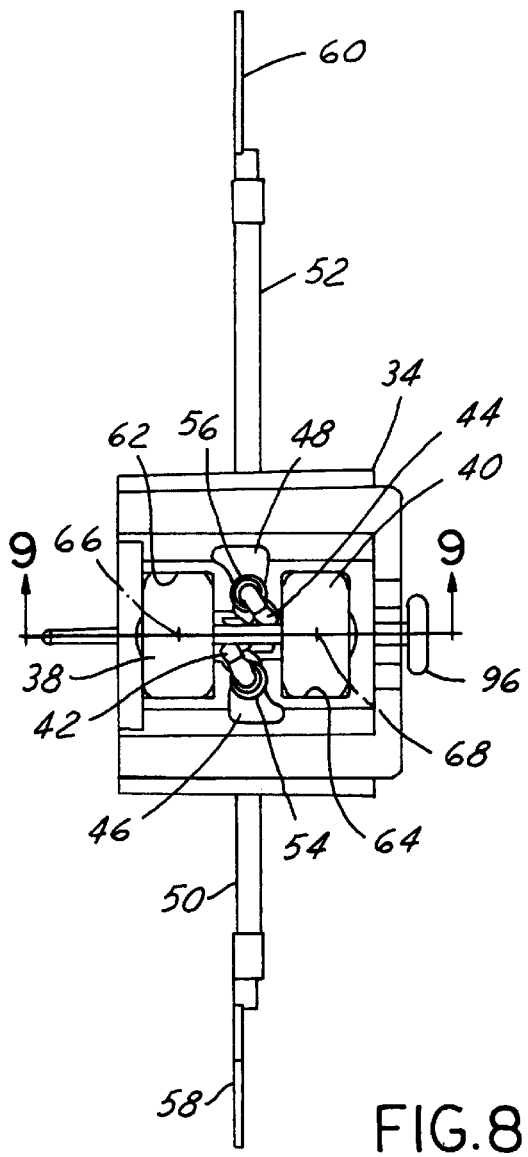
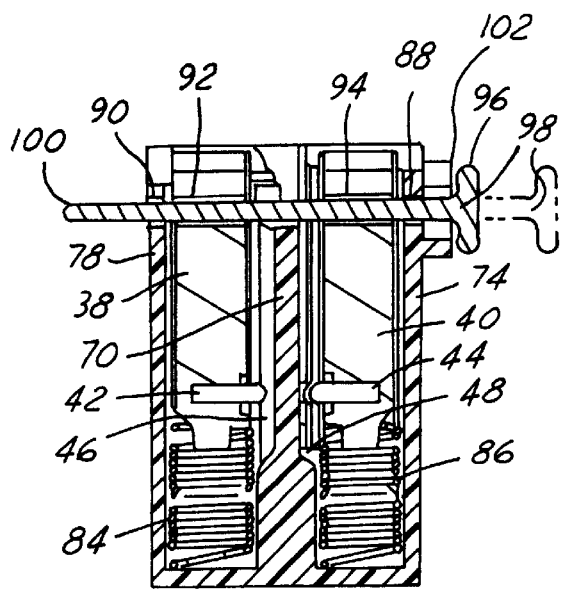
FIG.8
FIG.9

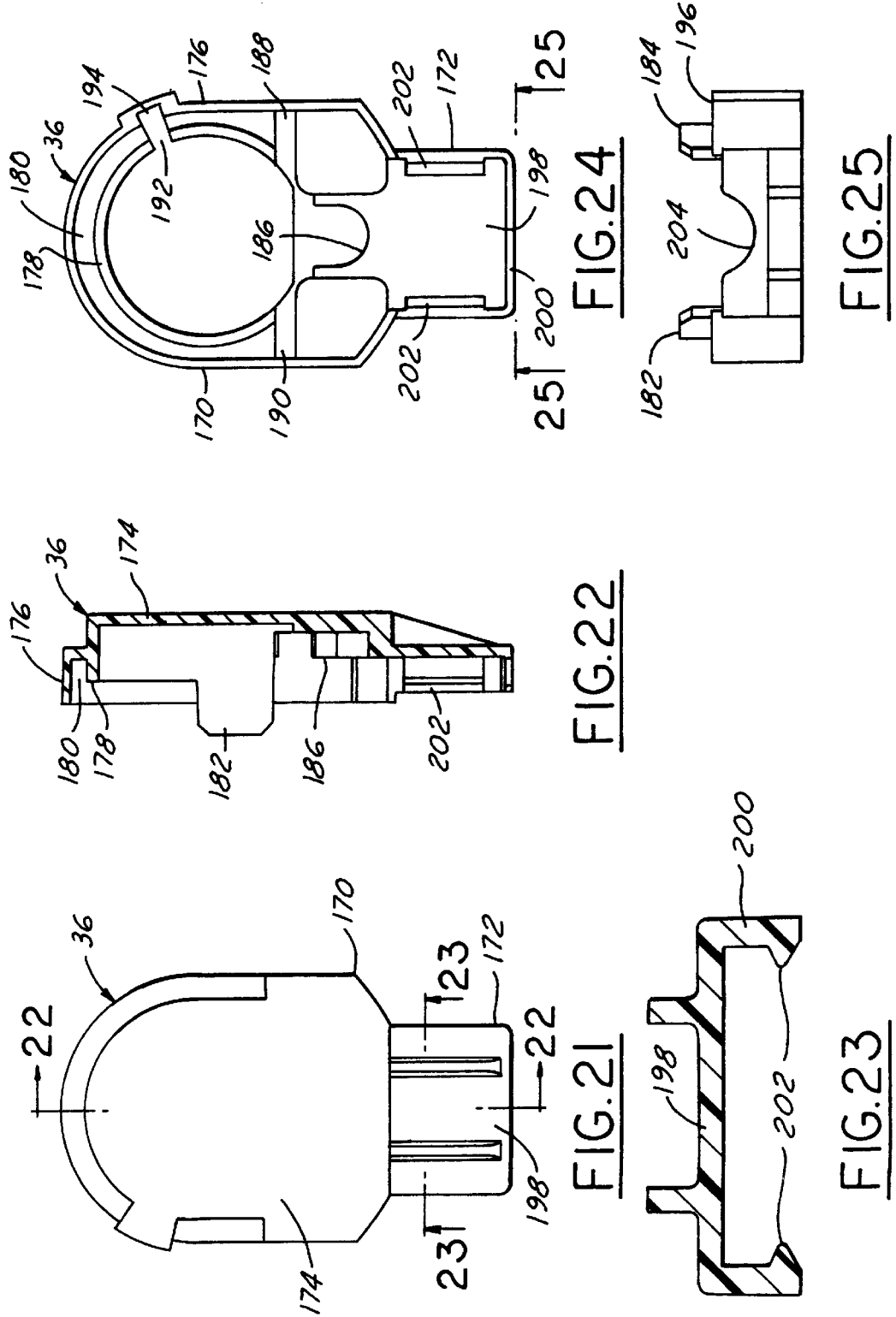

ALTERNATOR BEARING SLEEVE, BRUSH HOLDER, AND CAP SYSTEM

BACKGROUND OF THE INVENTION

1. Field of the Invention

This invention relates generally to rotating electric machines, and more specifically to a system for mounting brushes on an automotive vehicle alternator which comprises an assembly of a bearing sleeve, the brush holder, and a cap.

2. Background Information

A known automotive vehicle electrical system comprises a D.C. storage battery that is kept charged by an alternator that is powered by the vehicle's engine. Like similar rotating electric machines, a known automotive vehicle alternator contains electrically conductive brushes that are disposed in a brush holder mounted on a non-rotating portion of the electric machine and are spring-biased against conductive rings on a rotating portion of the machine for conveying electric current between rotating and non-rotating elements.

A known technique for mounting a brush holder on an alternator comprises joining the brush holder and a second piece together, such as by molding the second piece onto the brush holder for example, and then attaching the assembled pieces to the alternator housing, for example by fastening the second piece to the rear of the alternator housing by threaded fasteners. An example of this technique is represented by a Ford model 3G brush holder assembly.

Another known technique comprises integrating the brush holder with a rear bearing sleeve of the alternator. An example of this technique appears in U.S. Pat. No. 5,296,772.

It is believed to important for a brush holder to be rigidly mounted on an alternator in order to avoid potentially detrimental effects from repeated vibration to which the alternator is subjected during use on an automotive vehicle engine.

U.S. Pat. Nos. 3,233,130; 3,963,949; 4,680,495; 4,959,576; and 5,345,132; are believed representative of the state of the art. They disclose various forms of brush holder mountings.

SUMMARY OF THE INVENTION

One general aspect of the invention relates to an assembly for use with a rotating electric machine having an element which rotates about a longitudinal axis of the machine and with which the assembly co-axially associates, the assembly comprising: a first non-metallic part and a second non-metallic part mutually assembled; the second part comprising a brush guide containing a brush for establishing electric contact with a rotating element of the machine; each part comprising a respective pair of channels each of which has a length parallel to the longitudinal axis and respectively mutually interlocks with a respective one of the pair of channels of the other part; each interlocking pair of channels comprising a respective surface on the first part that is disposed in a plane parallel to the longitudinal axis and is mutually abutting a respective surface on the second part that is also disposed in a plane parallel to the longitudinal axis; each interlocking pair of channels further comprising a respective wedging surface that runs lengthwise along the respective channel of one of the parts and wedges a respective wedged surface that runs lengthwise along the respective channel of the other part to cause the mutually abutting surfaces of each respective pair of channels to forcefully mutually abut.

Another general aspect relates to an assembly for use with a rotating electric machine having an element which rotates about a longitudinal axis of the machine and with which the assembly co-axially associates, the assembly comprising: a first non-metallic part, a second non-metallic part, and a third non-metallic part; the first part and the second part comprising two pairs of mutually interlocking channels that associate the first part and the second part in mutual assembly; the first part comprising an open area across which channels of the first part confront each other, a transverse wall with which lengthwise ends of the channels of the first part join and away from which the channels of the first part extend in one direction along the longitudinal axis, a partially cylindrical shroud that is disposed about the longitudinal axis and at one axial end, joins with the transverse wall, and along the one direction of the longitudinal axis, joins with the channels of the first part, a cylindrical wall extending from the transverse wall in the other direction along the longitudinal axis to form a bearing cup for receiving a bearing assembly for journaling the machine element, and a through-hole in the transverse wall concentric with the longitudinal axis for providing through-passage of the machine element; the second part comprising two side-by-side brush guides each containing a respective brush for establishing electric contact with respective conductors on the machine element; and a third part comprising a closure that closes an axial end of the shroud opposite the axial end of the shroud that joins with the transverse wall and an attachment that attaches the third part to the second part.

Another general aspect relates to an assembly for use with a rotating electric machine having an element which rotates about a longitudinal axis of the machine and with which the assembly co-axially associates, the assembly comprising: a first injection-molded plastic part and a second injection-molded plastic part mutually assembled; the second part comprising a brush guide containing a brush for establishing electric contact with the machine element; each part comprising a respective pair of channels each of which has a length parallel to the longitudinal axis and respectively mutually interlocks with a respective one of the pair of channels of the other part; each pair of mutually interlocking channels comprising a respective surface on the first part that is disposed in a plane parallel to the longitudinal axis and in mutual abutment with a respective surface on the second part that is also disposed in a plane parallel to the longitudinal axis; each interlocking pair of channels further comprising a respective wedging surface that runs lengthwise along the respective channel of one of the parts and wedges a respective wedged surface that runs lengthwise along the respective channel of the other part to cause the mutually abutting surfaces of each respective pair of channels to forcefully mutually abut.

Another general aspect relates to a method of making an assembly for use with a rotating electric machine having an element which rotates about a longitudinal axis of the machine and with which the assembly co-axially associates, the method comprising: fabricating a first part by injection-molding plastic in a mold cavity having a single axis of draw that is along the longitudinal axis, including molding a pair of lengthwise extending channels each of which has a respective zero draft surface and a respective non-zero-draft wedging surface; fabricating a second part by injection-molding plastic in a mold cavity having a single axis of draw that is along the longitudinal axis, including molding a pair of lengthwise extending channels for interlocking with the channels of the first part, including molding each channel of the second part to have a respective zero draft surface and a respective non-zero-draft wedged surface, and including molding a brush guide for an electric brush; assembling the first and second parts together by aligning the channels of the first part with those of the second part and relatively moving the first and second parts along the longitudinal axis to mutually interlock each channel of the first part with a respective channel of the second part, including causing each wedging surface to act on a respective wedged surface so as to cause the zero draft surfaces of the respective pair of mutually interlocking channels to forcefully mutually abut.

Another general aspect relates to a method of making an assembly for use with a rotating electric machine having an element which rotates about a longitudinal axis of the machine and with which the assembly co-axially associates, the method comprising: fabricating a first part by injection-molding plastic, including molding a pair of lengthwise extending channels; fabricating a second part by injection-molding plastic, including molding a pair of lengthwise extending channels for interlocking with the channels of the first part, and including molding a brush guide for an electric brush; assembling the first and second parts together by aligning the channels of the first part with those of the second part and relatively advancing the first and second parts along a direction of the longitudinal axis to mutually interlock each channel of the first part with a respective channel of the second part; arresting relative longitudinal advancement of the two parts by mutually abutting respective wall surfaces of the two parts that are transverse to the longitudinal axis; and then staking the two parts together by thermally deforming ends of the channels of the first part that protrude from corresponding ends of the channels of the second part into formations that overlap the channels of the second part to thereby axially capture the second part between the formations and the transverse wall surface of the first part that is abutted by the transverse wall surface of the second part.

Another general aspect relates to a method of making an assembly for use with a rotating electric machine having an element which rotates about a longitudinal axis of the machine and with which the assembly co-axially associates, the method comprising the steps of: pinning a brush in retracted position in a brush holder part by passing a pin through holes in the brush and the brush holder that are aligned along an axis that is parallel to the longitudinal axis such that a distal end of the pin protrudes from the brush holder part; assembling the brush holder part to a further part by aligning the brush holder part with the further part and relatively advancing the two parts toward each other along a direction of the longitudinal axis, including abutting the distal end of the pin with the further part before advancement has been completed such that continued advancement causes a proximal end of the pin to increasingly protrude from the brush holder part; and then unpinning the brush from the brush holder part by pulling the proximal end of the pin to extract the pin from the aligned holes.

Further aspects will be seen in the ensuing description, claims, and accompanying drawings.

BRIEF DESCRIPTION OF THE DRAWINGS

The drawings that will now be briefly described are incorporated herein to illustrate a preferred embodiment of the invention and a best mode presently contemplated for carrying out the invention.

FIG. 8 is an enlarged view of one part of the assembly of FIG. 1, namely a brush holder, including a pair of brushes, looking toward the ends of the brushes that contact rotating elements of an alternator when installed on an alternator.

FIG. 9 is a cross section view in the direction of arrows 9—9 in FIG. 8.

FIG. 21 is an enlarged view of another part of the assembly of FIG. 1 by itself, namely a cap, in the same direction as the view of FIG. 1, but rotated 90° clockwise.

FIG. 22 is a cross section view in the direction of arrows 22—22 in FIG. 21.

FIG. 23 is an enlarged cross section view in the direction of arrows 23—23 in FIG. 21.

FIG. 24 is a full view in the direction of arrows 24—24 in FIG. 23.

FIG. 25 is a view in the direction of arrows 25—25 in FIG. 24.

DESCRIPTION OF THE PREFERRED EMBODIMENT(S)

Figure 1:
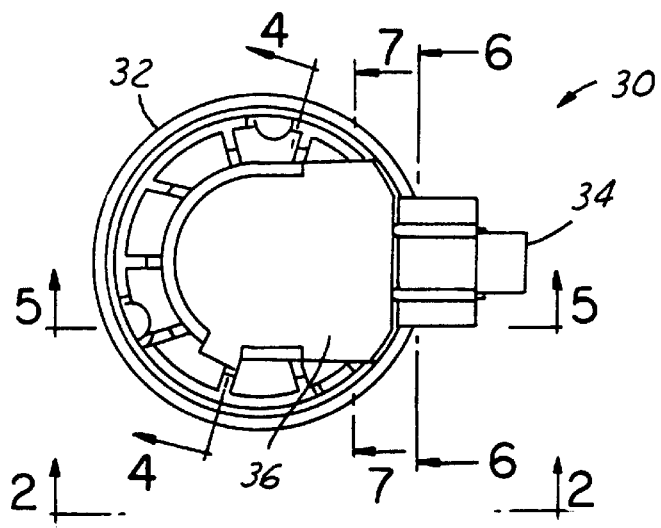
FIG. 1 is a rear view of an assembly embodying principles of the present invention, shown by itself apart from an alternator.
Figure 2:
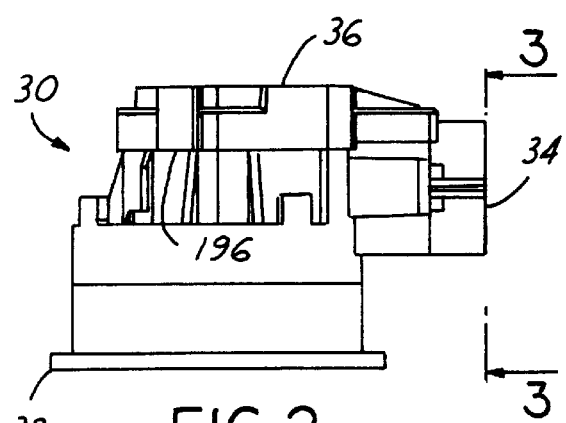
FIG. 2 is a bottom view in the direction of arrows 2—2 in FIG. 1.
Figure 3:
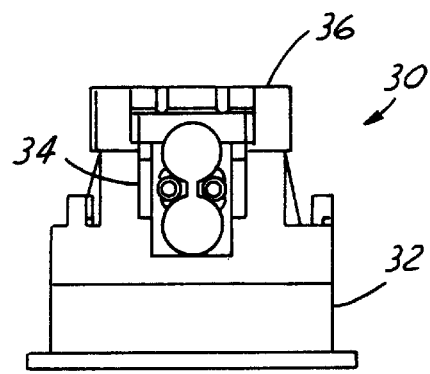
FIG. 3 is a right side view in the direction of arrows 3—3 in FIG. 2.
Figure 4:
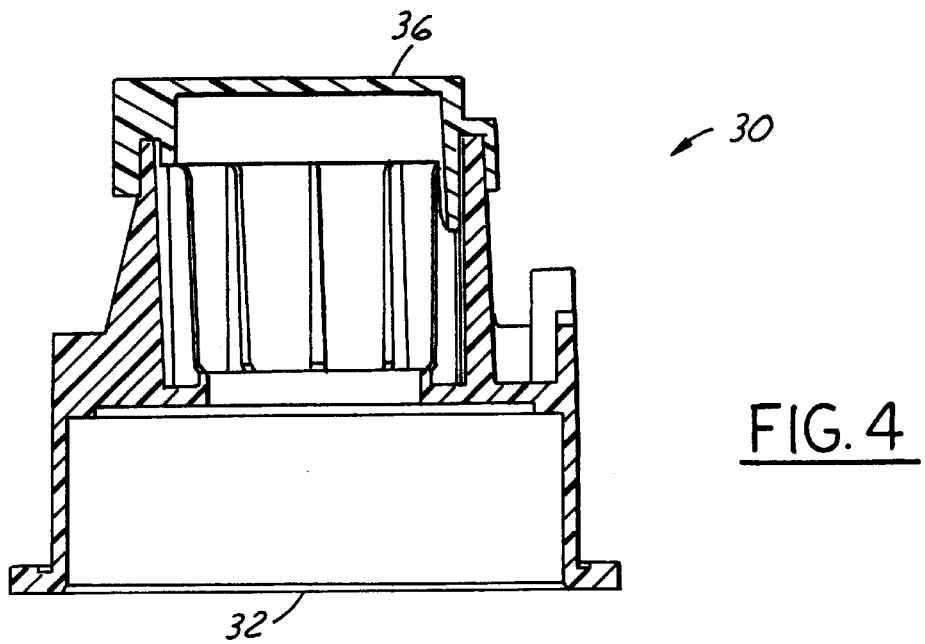
FIG. 4 is an enlarged cross section view in the direction of arrows 4—4 in FIG. 1.
Figure 5:
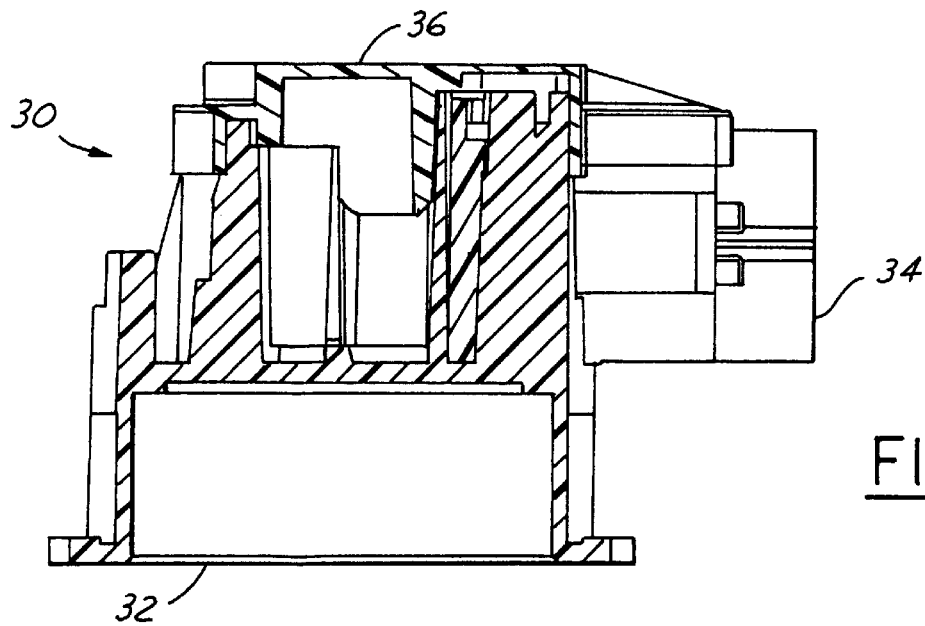
FIG. 5 is an enlarged cross section view in the direction of arrows 5—5 in FIG. 1.
Figure 6:
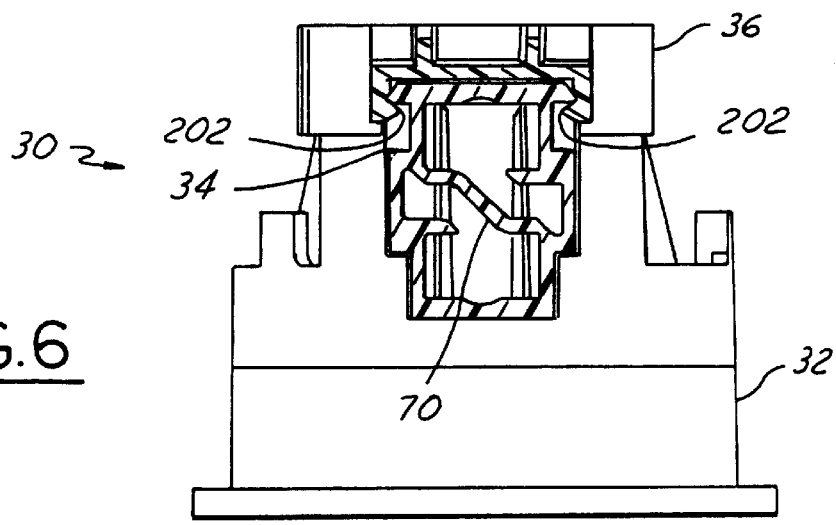
FIG. 6 is an enlarged cross section view in the direction of arrows 6—6 in FIG. 1.
Figure 7:
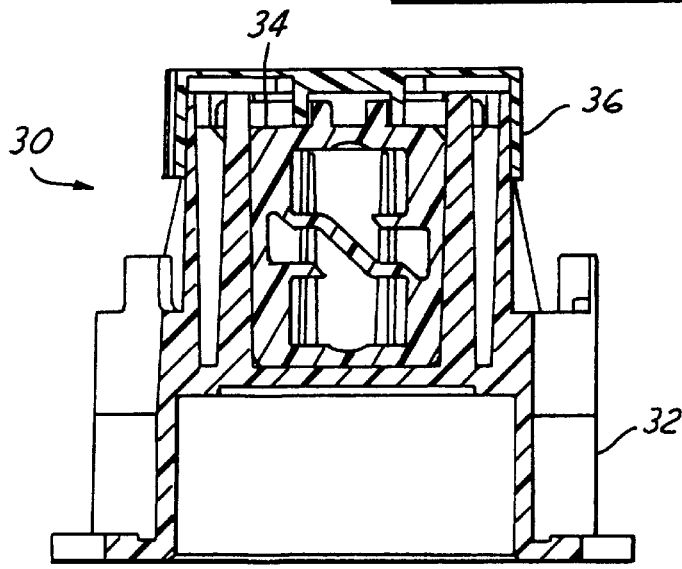
FIG. 7 is an enlarged cross section view in the direction of arrows 7—7 in FIG. 1.
Figure 10:
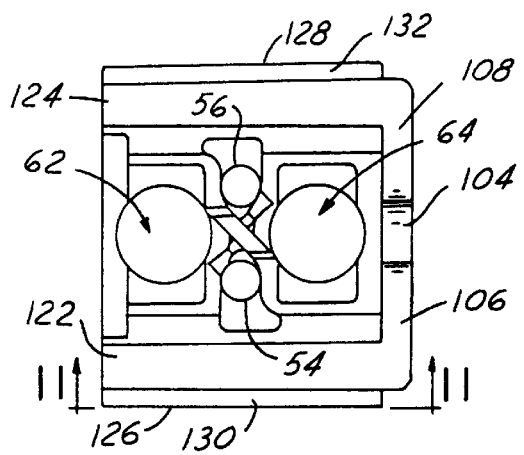
FIG. 10 is a view of the part of FIG. 8 looking in the same direction, but with the brushes removed.
Figure 11:
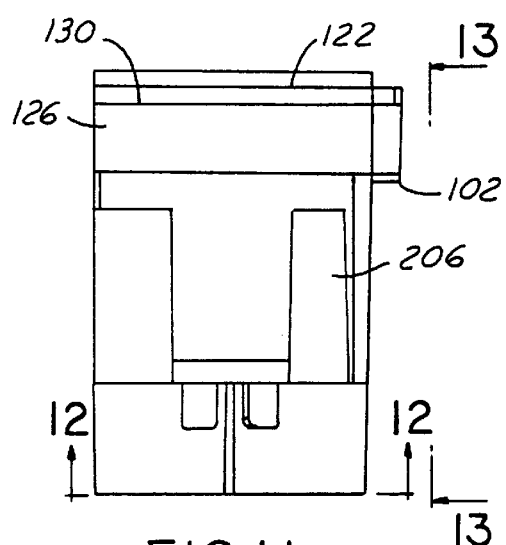
FIG. 11 is a view in the direction of arrows 11—11 in FIG. 10.

FIGS. 1 through 7 show an assembly 30 embodying principles of the invention. Assembly 30 comprises a bearing sleeve 32, shown by itself in FIGS. 14 through 20, a brush holder 34, shown by itself in FIGS. 10 through 13, and a cap 36, shown by itself in FIGS. 21 through 25. FIGS. 8 and 9 show brushes 38, 40 in brush holder 34.

Each part 32, 34, 36, is fabricated from suitable plastic material, such as glass reinforced polybutyleneterephtalate, using known injection molding processes. Brushes 38, 40 are fabricated from suitable brush material using known brush making processes. FIGS. 8 and 9 show that one end of a respective braided cable 42, 44 is joined with each brush 38, 40 and guided through a respective internal channelway 46, 48 in brush holder 34. An opposite end of each cable 42, 44 joins with one end of a respective stranded wire 50, 52. Each wire 50, 52 exits brush holder 34 through a respective hole 54, 56 in a wall of the brush holder. From at least where each wire 50, 52 exits brush holder 34, it is covered by an insulation jacket, but at the opposite end, the jacket has been stripped away to provide for each stranded wire to be joined to a respective eyelet 58, 60 that, in an alternator, is fastened to a respective terminal post, thereby establishing proper electric circuit connections for the alternator rotor via brushes 38, 40.

Brush holder 34 has two side-by-side blind holes 62, 64 that have respective parallel axes 66, 68. FIG. 8 is a view looking into holes 62, 64. A near portion of each hole as viewed in FIG. 8 has a nominal rectangular transverse cross section slightly larger than the transverse cross section of the respective brush 38, 40 for guiding the respective brush for motion along the respective axis 66, 68. The far portion of each hole is the bottom, which has a circular transverse cross section. Holes 62, 62 are separated by a diagonal partition 70 along their confronting sides. Channelways 46, 48 run along opposite sides of partition 70 to respective holes 54, 56. The portion of a side wall of brush holder 34 that is generally coextensive with the lengths of the rectangular cross sectioned portions of holes 62, 64 has a generally rectangular shape comprising four sides 72, 74, 76, 78. The portion of the brush holder wall that contains the circular cross sectioned bottom portions of holes 62, 64 comprises two side-by-side cylindrical walled formations 80, 82 that are closed at the bottoms of holes 62, 64.

Before each brush is assembled into its respective hole through the hole's open end, one end of a respective helical coiled brush spring 84, 86 is fitted over a locator formation on the inner end of the brush. When a brush is being assembled into a respective hole, the opposite end of the respective spring is first introduced into the respective hole, followed by the brush. With increasing insertion, that opposite end of each spring seats in the bottom of the respective hole. Continued insertion of the brush now resiliently increasingly compresses the respective spring until a condition like that shown in FIG. 9 occurs. Such a condition represents a fully retracted brush position where each brush is essentially fully within the respective hole.

Figure 13:
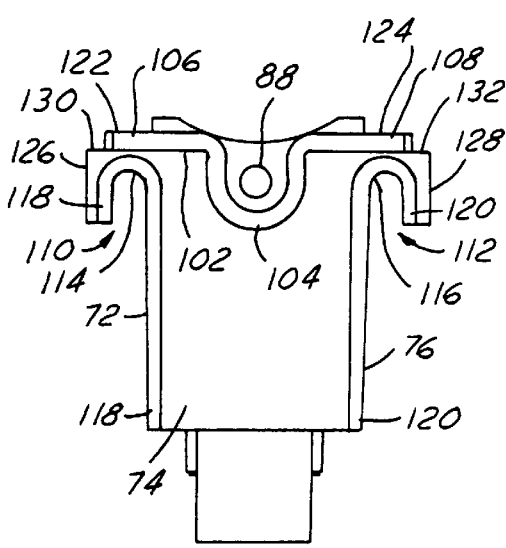
FIG. 13 is a view in the direction of arrows 13—13 in FIG. 11.

Proximate the open ends of holes 62, 64, opposite sides 74, 78 contain aligned circular holes 88, 90. Each brush 38, 40 contains a respective circular hole 92, 94 that aligns with holes 88, 90. The brushes are held in fully retracted position by a pin 96, which comprises a circular head 98 and a cylindrical shank 100. Shank 100 passes from head 98 through the aligned holes 88, 94, 92, 90 in that order. The extent to which pin 96 can be inserted is limited by abutment of head 98 with a ridge 102 on side 74. FIG. 13 shows ridge 102 to have a central U-shaped segment 104 within which hole 88 is centered, and side segments 106, 108 extending laterally from ends of the U-shaped segment 104. FIG. 9 shows that with head 98 abutting ridge 102, the distal end of shank 100 protrudes a certain distance out of hole 90 on the opposite side of the brush holder from head 98.

Proximate the open ends of holes 62, 64 are channels 110, 112 that run lengthwise along opposite sides 76, 80 of the brush holder side wall between sides 74 and 78. Each channel 110, 112 is open along its entire length toward a general direction that is opposite the general direction toward which holes 62, 64 are open. Viewed endwise, as in FIG. 13, each channel 110, 112 is also open and seen to have a respective U-shaped interior wall surface 114, 116 forming a respective throat that opens downward as viewed in that Figure. The terminations of each channel 110, 112 at side 74 comprise respective chamfers 118, 120, each of which is coextensive with the respective channel's throat and continues along the respective corner of the brush holder side wall where the respective sides 72, 76 adjoin side 74.

Figure 12:
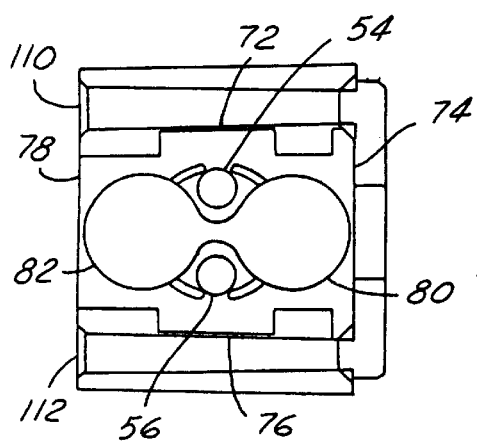
FIG. 12 is a view in the direction of arrows 12—12 in FIG. 11.

The U-shaped wall surfaces 114, 116 are essentially identical in dimension, but such surfaces are not of constant transverse cross sectional dimension along their lengths. That is because certain tapering is imparted to each channel. As shown in FIG. 12 each surface 114, 116 has dimension as measured between sides of the U that progressively decreases in the direction from side 78 toward side 74, thereby imparting narrowing tapers to the channels' widths in that direction. The channels also have tapers in orthogonal directions, as will be more fully explained later. Each channel also has respective co-planar exterior wall surfaces 122, 124, and respective exterior wall surfaces 126, 128 that are approximately, but not exactly, perpendicular to the respective wall surfaces 122, 124. Each wall surface 126, 128 adjoins the respective wall surface 122, 124 via a respective ledge 130, 132 that runs along the length of the respective channel 110, 112. Wall surfaces 122, 124 are also co-planar with respective surfaces of segments 106, 108 of ridge 102.

Figure 14:
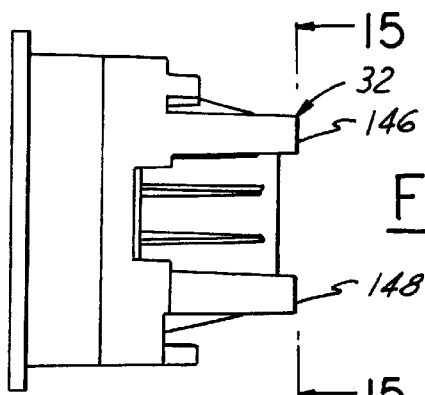
FIG. 14 is a view of another part of the assembly of FIG. 1 by itself, namely a bearing sleeve, in the same direction as the view of FIG. 6, but rotated 90° clockwise.
Figure 15:
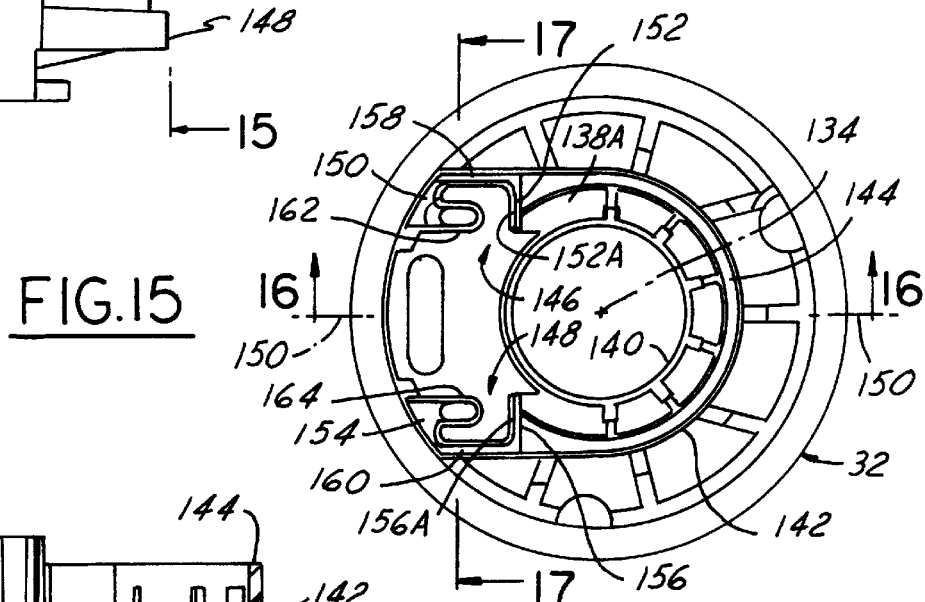
FIG. 15 is an enlarged view in the direction of arrows 15—15 in FIG. 14.
Figure 16:
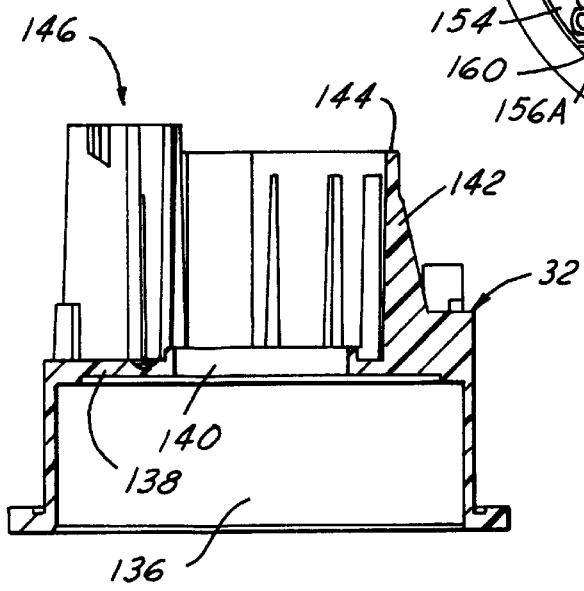
FIG. 16 is a cross section view in the direction of arrows 16—16 in FIG. 15.
Figure 17:
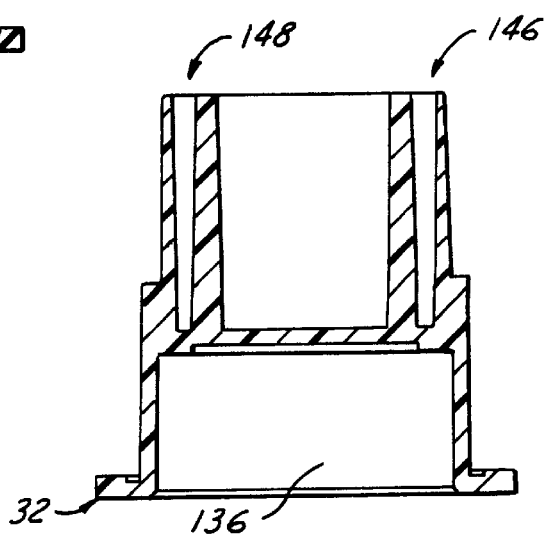
FIG. 17 is a cross section view in the direction of arrows 17—17 in FIG. 15.
Figure 18:
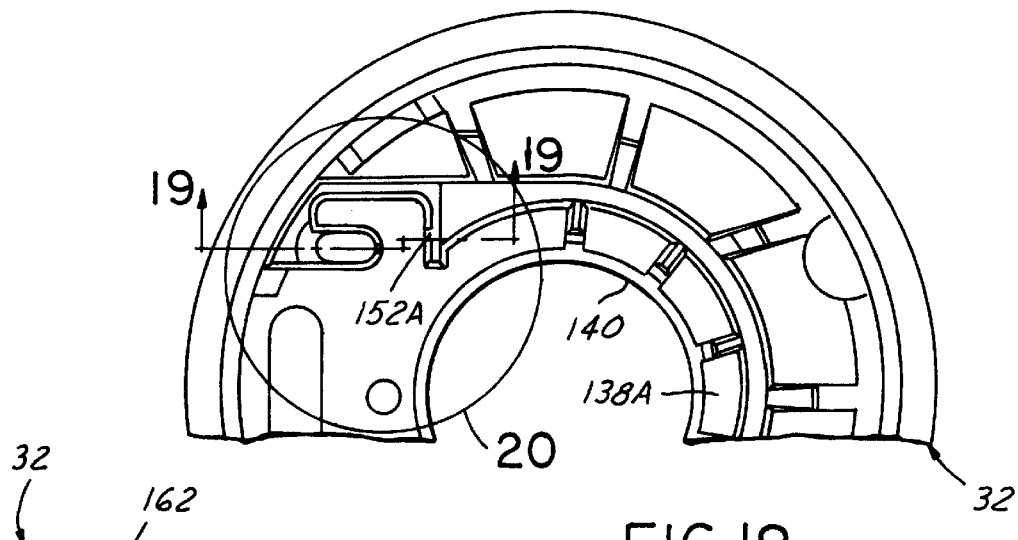
FIG. 18 is an enlarged fragmentary view of a portion of FIG. 15.

Detail of sleeve 32 is presented in FIGS. 14 through 20. Sleeve 32 has a central longitudinal axis 134. Approximately one half the overall length of sleeve 32 is a circular cylindrical walled cup 136 that is open at one end of the sleeve. A circular bearing assembly of an alternator (not shown) fits into cup 136 when assembly 30 is installed in the alternator. The bearing assembly has an outer race that is snugly received in cup 136 and an inner race to which a rotary shaft of the alternator is pressed. The other half of sleeve 32 is adapted for association with both brush holder 34 and cap 36.

Where its two halves adjoin, sleeve 32 has a transverse wall 138 that contains a circular hole 140 concentric with axis 134. Wall 138 may be considered the bottom of cup 136. Hole 140 provides for through-passage of the alternator shaft that is journaled in the bearing assembly in cup 136. The portion of the alternator shaft that protrudes from hole 140 contains two circular conductors, each of which is engaged by the inner end of a respective brush 38, 40 when assembly 30 has been installed in the alternator. The half of sleeve 32 beyond cup 136 comprises a shroud 142. As shown by FIG. 15, shroud 142 comprises a wall 144 centered to axis 134 and having a circumferential extent about axis 134 just slightly less than three-quarters of a full circle. Adjoining respective circumferential terminations of wall 144 are respective channels 146, 148 whose lengths run generally parallel with axis 134. As shown by FIGS. 14 and 16, the axial lengths of channels 146, 148 are somewhat longer than that of wall 144. FIG. 14 shows that shroud 142 is open between the two channels.

Each channel 146, 148 is constructed for cooperative association with channels 110, 112 of brush holder 34. The two channels are disposed symmetrically opposite each other relative to an imaginary medial plane 150 (see FIG. 15) that contains axis 134. As such, they are disposed in opposite hemispheres, but in generally confronting relation to each other. Each channel 146, 148 may be considered to comprise respective opposite side walls, 150, 152 in the case of channel 146, and 154, 156 in the case of channel 148. Side walls 150, 152 are joined by a third, or base, wall 158, and side walls 154, 156 are joined by a third, or base, wall 160. Each channel 146, 148 further comprises a respective fourth wall 162, 164. Each fourth wall 162, 164 extends lengthwise from transverse wall 138 and adjoins the edge of the respective side wall 150, 154 opposite the respective base wall 158, 160 for most of the length of the respective side wall 150, 154.

By turning FIG. 15 90° counterclockwise and then comparing that Figure with FIG. 13 (the scale of the latter is slightly larger), one can see that channels 146, 148 have been endowed with shapes that are complementary to those of channels 110, 112 such that when the two separate parts 32 and 34 are disposed with channel 110 in proper alignment with channel 146 and with channel 112 in proper alignment with channel 148, and the two parts are moved axially together, each pair of aligned channels slide together in mutually interlocking engagement because of the channels' interlocking shapes. When the channels are so interlocked, wall 162 fits within the throat of channel 110, and wall 164 fits within the throat of channel 112. Surface 126 confronts base wall 158, surface 130 confronts side wall 152, surface 128 confronts base wall 160, and surface 132 confronts side wall 156. The interlocking channels contain further features that allow the two parts to be slid together into an assembled relationship where they are rigidly secured and precisely located to each other. Before those features are described in detail, a brief description of a method of making the parts will provide a useful background.

As mentioned earlier, each part is intended to be fabricated by injection molding. Moreover the design of each part allows it to be injection molded by a die that has only a single axis of draw. In other words, the die requires no off-axis slides.

Brush holder 34 has been designed so that the direction of draw can be parallel to axes 66, 68. Accordingly, the surfaces of ledges 130, 132 can be molded to lie in a plane that is exactly perpendicular to axes 66, 68 because they do not lie along the direction of draw.

Figure 20:
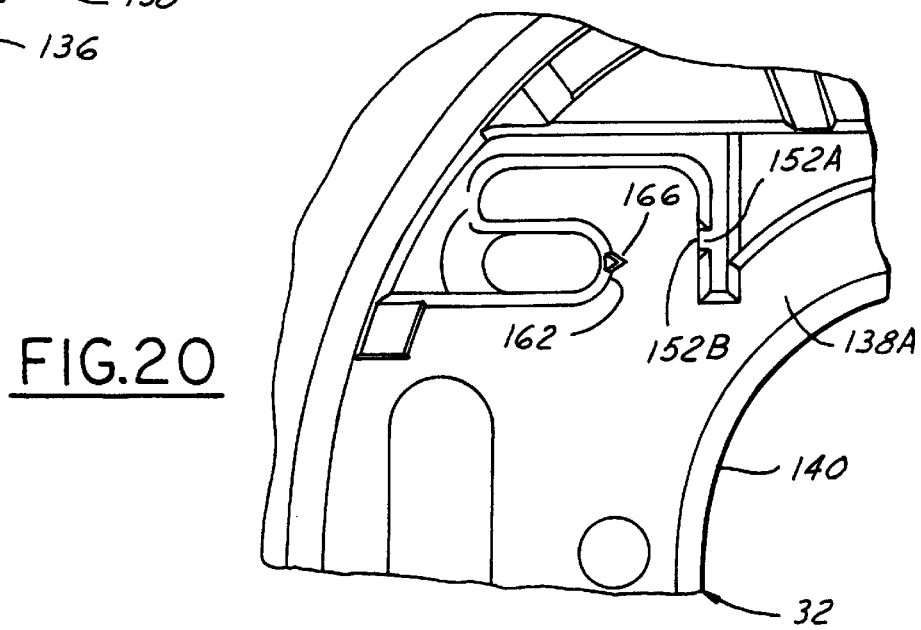
FIG. 20 is an enlarged view substantially in circle 20 in FIG. 18.

Sleeve 32 has been designed so that the direction of draw of its mold can be parallel to axis 134. Accordingly, the surface 138A of wall 138 that faces the reader in any of FIGS. 15, 18, and 20 can be molded to be substantially perpendicular to axis 134, but also to have a desired taper in an area where it is abutted by side 78 of brush holder 34 when the two parts 32, 34 are assembled together. Because channels 146, 148 run along the direction of draw, some mold draft is required. The geometry imparted to channels 146, 148 to provide that draft is done in a particular way however. Side walls 152, 156 contain respective ribs 152A, 156A that are raised in directions toward walls 162, 164 respectively. FIG. 20 shows rib 152A in detail. It can be seen that rib 152A has a flat surface 152B facing wall 162. Rib 156A has a like surface facing wall 164. Surface 152B and the corresponding surface of rib 156A are zero draft surfaces, meaning that they lie exactly along the direction of draw, exactly parallel to axis 134. Draft for the respective channels 146, 148 is incorporated in walls 162, 164. Ribs 152A, 156A are two of the features for obtaining rigid and precise assembly of sleeve 32 and brush holder 34. Features resulting from the draft incorporated in walls 162, 164 are further features used to advantage when sleeve 32 and brush holder 34 are assembled together, and they will now be described.

Figure 19:
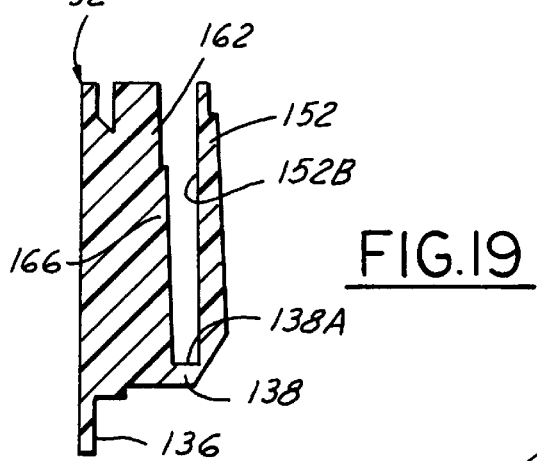
FIG. 19 is a fragmentary cross section view in the direction of arrows 19—19 in FIG. 18.

FIG. 19 shows a lengthwise profile of surface 152B. Wall 162 is directly opposite that surface across an open area of channel 146, and the profile of its surface that is directly opposite surface 152B also appears in FIG. 19. Extending from wall surface 138A along a majority of the length of the free edge of wall 162 is a raised crush rib 166. It can be seen that draft is incorporated in crush rib 166 such that the distance between it and surface 152B tapers along the length of channel 146. Specifically, the taper narrows in the direction toward wall 138. Wall 164 of channel 148 contains a like crush rib directly opposite, and confronting, the zero draft surface of rib 156A.

It was mentioned earlier that each channel 110, 112 has a taper that is orthogonal to the taper that appears in FIG. 12. That additional taper of each channel occurs in the vertical direction of FIG. 13. Specifically, the additional taper is a progressive increase in dimension between each zero draft surface 122, 124 and the semi-circular portion of the respective surface 114, 116 in the direction from side 78 to side 74.

The geometries of each pair of mutually interlocking channels are such that as the two parts 32, 34 are being assembled together by sliding the channels of one part into those of the other, the crush ribs ride along the central regions of the semi-circular surface portions of surfaces 114, 116 while zero draft surfaces 122, 124 ride along the zero draft surfaces of ribs 152A, 156A, the latter being narrower in width than the former. Before the sliding is arrested by abutment of side 78 with an area of wall surface 138A, the interactions between the crush ribs of channels 146, 148 and the surfaces 114, 116 of channels 110, 112 increasingly force the abutting zero draft surfaces together as they slide along each other. The action may be considered a wedging one. The crush ribs may actually experience a certain degree of limited crushing which aids the wedging action. In final assembled position, the abutting zero draft surfaces are being forced together along a major extent of the interlocking channels' lengths. Such forceful abutment of zero draft surfaces provides not only rigidity but also precision in establishing a desired geometric relationship between the parts when assembled.

Because of relationships that were explained earlier, it is also assured that axes 66, 68 will lie in respective planes that are perpendicular to axis 134. Rigidity of each part to the other is further enhanced by imparting to the area of wall surface 138 that is abutted by a portion of side 78 of brush holder 32, a taper that matches the taper of that portion of side 78. When that portion of side 78 abuts that area of surface 138A, precisely matching tapers will provide full surface-to-surface abutment. The nature of these relationships also assures that axes 66, 68 will be extremely close to, if not exactly, intersecting axis 134 without further controlled surface-to-surface abutments.

With the two parts 32, 34 having been fitted fully together in the manner just described, brush holder 34 essentially closes the open area of shroud 142 that lies between channels 146, 148. The distal ends of walls 162, 162 will also be protruding slightly from side 74 of the brush holder. The two parts 32, 34 are then united by a heat staking operation that deforms those protruding wall ends into heads that abut and fill the surrounding portions of chamfers 118 and 120.

A further aspect of the invention may now be understood from reconsideration of FIG. 9. Brushes 38, 40 are pinned in retracted position as brush holder 34 is being assembled to sleeve 32. At some point during the assembly process, the distal end of shank 100 will abut wall 138, arresting further motion of pin 96 relative to sleeve 32. As the process continues, pin 96 will move relative to brush holder 34 with shank 100 sliding through the aligned holes 90, 92, 94, 88 to move head 98 toward the broken line position. Consequently, when the two parts 32, 34 have been fully assembled, head 98 protrudes a sufficient distance for convenient grabbing by an extraction tool at a point in the alternator fabrication process where it is desired to release the brushes by extracting pin 96 from brush holder 34. The material of pin 96 is preferably non-metallic, a nylon for example.

Assembly 30 is completed by attachment of cap 36 to the united sleeve and brush holder. FIGS. 21–25 show cap 36 to comprise a closure 170 for closing the open end of sleeve 32 opposite cup 136, including closing the ends of the interlocking channels of the sleeve and brush holder, and a catch 172 for attaching cap 36 to the brush holder.

Closure 170 comprises an end wall 174 that is generally transverse to axis 134 and a rim 176 that extends around the margin of end wall 174 for axially overlapping the end margin of shroud 142. End wall 174 and rim 176 include several features that associate with shroud 142. One feature is a flange 178 that is spaced inward from rim 176 to endow closure 170 with a groove 180 that receives the end margin of shroud 142 when cap 36 is assembled to sleeve 32 and brush holder 34. Groove 180 has an angular extent about axis 134 that is coextensive with the portion of shroud 142 that extends approximately three-quarters of a full circle between channels 146, 148. At its ends flange 178 has tongues 182, 184 that project more fully into the interior of the shroud. Midway between, and slightly below, tongues 182, 184, considered with reference to FIGS. 22 and 24, a raised locating feature 186 on the interior of end wall 174 serves to locate cap 36 to segment 104 of ridge 102. To either side of, and slightly above, locating feature 186 are two short grooves 188, 190 that serve to locate the cap to segments 106, 108 of ridge 102. A radial notch 192 through flange 178 and a channel 194 formed in rim 176 in circumferential registration with notch 192 provide a drain that is open at 196 for gravity drainage of condensation from the space enclosed by cap 36 when attached.

Catch 172 comprises a wall 198 that extends from closure 170. Wall 198 has a generally rectangular shape with a rim 200 around its margin for fitting over a portion of brush holder 34 that protrudes from sleeve 32. Along opposite sides of rim 200 are pointed ribs 202 that point toward each other. Ribs 202 are parallel and spaced from wall 198. Along a portion of rim 200 that extends between its sides is a notch 204 for fitting to the outside of formation 80 of brush holder 34. Sides 72 and 76 of brush holder 34 contain rectangular depressions 206 immediately adjacent the portions of chamfers 118, 120 that run along the corners of the brush holder side wall where the respective sides 72, 76 adjoin side 74.

Cap 36 is assembled to the united sleeve and brush holder by first at least approximately aligning it with the end of the sleeve and brush holder and then pushing it onto the sleeve and brush holder. The margin of shroud 142 has already entered groove 180 before catch 172 begins to interact with brush holder 34. Tapered outer faces of ribs 202 first abut chamfers 118, 120. Cap 36 has a construction that, as pushing force continues to be applied to it, allows catch 172 to deform in a manner that enables ribs 202 to ride over the chamfers and finally lodge in depressions 206 behind the chamfers. That action concurrently places closure 170 in full closure of the end of sleeve 32. The fit of the shroud margin in groove 180 creates a labyrinth seal while notch 192 and channel 194 create a small drain through which condensation and exit. The drain is located relative to axis 134 so as to be at the lowest elevation when assembly 30 is in an alternator.

Certain constructional features of parts 32, 34, and 36 that appear in the Figures do not bear directly on the subject matter of the present invention have not been specifically described in the interest of brevity. In general they relate to good molding practices and include for example a number of triangular braces for rigidifying walls that are angularly related.

While a presently preferred embodiment has been illustrated and described, it is to be appreciated that the invention may be practiced in various forms within the scope of the following claims.

What is claimed is:

1. An assembly for use with a rotating electric machine having an element which rotates about a longitudinal axis of the machine and with which the assembly co-axially associates, the assembly comprising:

a first non-metallic part and a second non-metallic part mutually assembled;

the second part comprising a brush guide containing a brush for establishing electric contact with a rotating element of the machine;

each part comprising a respective pair of channels each of which has a length parallel to the longitudinal axis and respectively mutually interlocks with a respective one of the pair of channels of the other part;

each interlocking pair of channels comprising a respective surface on the first part that is disposed in a plane parallel to the longitudinal axis and is mutually abutting a respective surface on the second part that is also disposed in a plane parallel to the longitudinal axis;

each interlocking pair of channels further comprising a respective tapered wedging surface that runs and tapers lengthwise along the respective channel of one of the parts and wedges a respective wedged surface that runs lengthwise along the respective channel of the other part to cause the mutually abutting surfaces of each respective pair of channels to forcefully mutually abut.

2. An assembly as set forth in claim 1 in which the one part is the first part and the other part is the second part.

3. An assembly as set forth in claim 2 in which the one part comprises a respective crush rib that runs lengthwise along each of its respective channels, and each tapered wedging surface is a surface of a respective crush rib.

4. An assembly as set forth in claim 3 in which each crush rib runs lengthwise along a free edge of a respective wall of its respective channel, each channel of the other part has a transverse cross section that comprises a throat within which the free edge of the wall of the respective channel of the one part is disposed, and each wedged surface is a surface of the respective throat that is opposite an entrance of the respective throat.

5. An assembly as set forth in claim 4 in which each channel of the other part has an interior surface of U-shaped transverse cross section that defines the respective throat, and the free edge of the wall of the respective channel of the one part has a transverse cross section shape that fits closely within the U-shaped transverse cross section of the respective channel of the other part.

6. An assembly as set forth in claim 5 in which each crush rib extends along a majority of the length of the free edge of the respective wall of the respective channel, and the tapered wedging surfaces and the wedged surfaces are slightly non-parallel to the longitudinal axis.

7. An assembly as set forth in claim 1 in which corresponding lengthwise ends of the channels of the first part join with a transverse wall of the first part from which the channels of the first part extend, a surface of the transverse wall of the first part and a transverse surface of the second part are mutually abutting, and each wall of a respective channel of the first part protrudes lengthwise beyond the respective channel of the second part relative to the transverse wall of the first part, and each such protruding wall is formed to overlap and abut a transverse surface at a corresponding lengthwise end of the respective channel of the second part to thereby cause the channels of the second part to be axially captured by the first part.

8. An assembly as set forth in claim 1 in which the second part comprises a second brush guide containing a second brush, the brush guides are arranged to guide the respective brushes radially of the longitudinal axis, and the brush guides are spaced apart along the longitudinal axis.

9. An assembly as set forth in claim 1 in which the channels of the first part confront each other across an open area of the first part, the first part comprises a transverse wall with which corresponding lengthwise ends of the channels of the first part join and away from which the channels of the first part extend in one direction along the longitudinal axis, a partially cylindrical shroud that is disposed about the longitudinal axis and at one axial end, joins with the transverse wall, and along the one direction of the longitudinal axis, joins with the channels of the first part.

10. An assembly as set forth in claim 9 further including a third part comprising a closure that closes an axial end of the shroud opposite the axial end of the shroud that joins with the transverse wall and an attachment that attaches the third part to the second part.

11. An assembly as set forth in claim 10 in which the attachment of the third part to the second part comprises catches on the third part that catch on the second part, and the closure comprises a groove that fits to an edge of the shroud to form a labyrinth seal of the closure to the shroud.

12. An assembly as set forth in claim 9 in which the first part comprises a bearing cup for receiving a bearing assembly, the cup comprises a cylindrical wall extending from the transverse wall in the other direction along the longitudinal axis, and the transverse wall comprises a through-hole concentric with the longitudinal axis.

13. An assembly as set forth in claim 1 in which one of the mutually abutting surfaces of each pair of interlocking channels that are disposed in planes parallel to the longitudinal axis is a surface of a rib that has a width perpendicular to a length, and the other of the mutually abutting surfaces of each pair of interlocking channels that are disposed in planes parallel to the longitudinal axis is a portion of a flat surface having width greater than that of the respective rib.

14. An assembly as set forth in claim 13 in which the first part contains the ribs.

15. An assembly for use with a rotating electric machine having an element which rotates about a longitudinal axis of the machine and with which the assembly co-axially associates, the assembly comprising:
a first non-metallic part, a second non-metallic part, and a third non-metallic part;
the first part and the second part comprising two pairs of mutually interlocking channels that associate the first part and the second part in mutual assembly;
the first part comprising an open area across which channels of the first part confront each other, a transverse wall with which lengthwise ends of the channels of the first part join and away from which the channels of the first part extend in one direction along the longitudinal axis, a partially cylindrical shroud that is disposed about the longitudinal axis and at one axial end, joins with the transverse wall, and along the one direction of the longitudinal axis, joins with the channels of the first part, a cylindrical wall extending from the transverse wall in the other direction along the longitudinal axis to form a bearing cup for receiving a bearing assembly for journaling the machine element, and a through-hole in the transverse wall concentric with the longitudinal axis for providing through-passage of the machine element;
the second part comprising two side-by-side brush guides each containing a respective brush for establishing electric contact with respective conductors on the machine element; and
a third part comprising a closure that closes an axial end of the shroud opposite the axial end of the shroud that joins with the transverse wall and an attachment that attaches the third part to the second part.

16. An assembly as set forth in claim 15 in which each pair of mutually interlocking channels comprise a respective surface on the first part that is disposed in a plane parallel to the longitudinal axis and in mutual abutment with a respective surface on the second part that is also disposed in a plane parallel to the longitudinal axis;
each interlocking pair of channels further comprising a respective tapered wedging surface that runs and tapers lengthwise along the respective channel of one of the parts and wedges a respective wedged surface that runs lengthwise along the respective channel of the other part to cause the mutually abutting surfaces of each respective pair of channels to forcefully mutually abut.

17. An assembly as set forth in claim 15 in which the attachment of the third part to the second part comprises catches on the third part that catch on the second part, and the closure comprises a groove that fits to an edge of the shroud to form a labyrinth seal of the closure to the shroud.

18. An assembly as set forth in claim 15 in which each non-metallic part comprises an injection-molded plastic.

19. An assembly for use with a rotating electric machine having an element which rotates about a longitudinal axis of the machine and with which the assembly co-axially associates, the assembly comprising:
a first injection-molded plastic part and a second injection-molded plastic part mutually assembled;
the second part comprising a brush guide containing a brush for establishing electric contact with the machine element;
each part comprising a respective pair of channels each of which has a length parallel to the longitudinal axis and respectively mutually interlocks with a respective one of the pair of channels of the other part;
each pair of mutually interlocking channels comprising a respective surface on the first part that is disposed in a plane parallel to the longitudinal axis and in mutual abutment with a respective surface on the second part that is also disposed in a plane parallel to the longitudinal axis;
each interlocking pair of channels further comprising a respective tapered wedging surface that runs and tapers lengthwise along the respective channel of one of the parts and wedges a respective wedged surface that runs lengthwise along the respective channel of the other part to cause the mutually abutting surfaces of each respective pair of channels to forcefully mutually abut.

* * * * *